Feb. 6, 1923.

C. H. BERRY.
COMPENSATING GAUGE.
FILED MAY 12, 1920.

Inventor
C. Harold Berry

By Shepherd & Campbell
Attorney

Patented Feb. 6, 1923.

1,444,098

UNITED STATES PATENT OFFICE.

CHARLES HAROLD BERRY, OF DETROIT, MICHIGAN.

COMPENSATING GAUGE.

Application filed May 12, 1920. Serial No. 380,379.

*To all whom it may concern:*

Be it known that I, CHARLES HAROLD BERRY, a citizen of the United States, residing at 368 Clarendon Avenue, Detroit, in the county of Wayne and State of Michigan, have invented certain new and useful Improvements in Compensating Gauges, of which the following is a specification, reference being had therein to the accompanying drawings.

The object of the present invention is to provide a gauge constructed in such manner that the true pressure may be ascertained therefrom without computation, irrespective of variations in atmospheric pressure.

The present invention contemplates the provision of a gauge having a dial graduated in terms of absolute pressure, a pressure indicating pointer movable with respect to said dial and connections to shift the said pointer with respect to the dial in such manner as to compensate for variations in atmospheric pressure.

In my copending application, Serial Number 376,366 filed on the 24th day of April, 1920, which resulted in grant of U. S. Patent, No. 1,413,514, I have disclosed a construction wherein the dial is mounted to move under the influence of an aneroid barometer to effect such compensatory action while in my copending application, Serial Number 376,365 filed on the 24th day of April, 1920, which resulted in the grant of U. S. Patent No. 1,420,953, I have disclosed a construction wherein the dial of the gauge is movable with respect to the pointer to effect such compensatory action but the adjustment of the dial is effected manually.

The present invention, as before stated, aims to provide a gauge wherein the compensatory action is secured by movement of the pointer with respect to the dial and I may effect such compensatory action automatically through the medium of an aneroid or other barometer or manually, as may be desired.

Further objects and advantages of the invention will be set forth in the detailed description which now follows.

In the accompanying drawings.

Like characters of reference designate corresponding parts throughout the several figures of the drawings.

Figure 1:
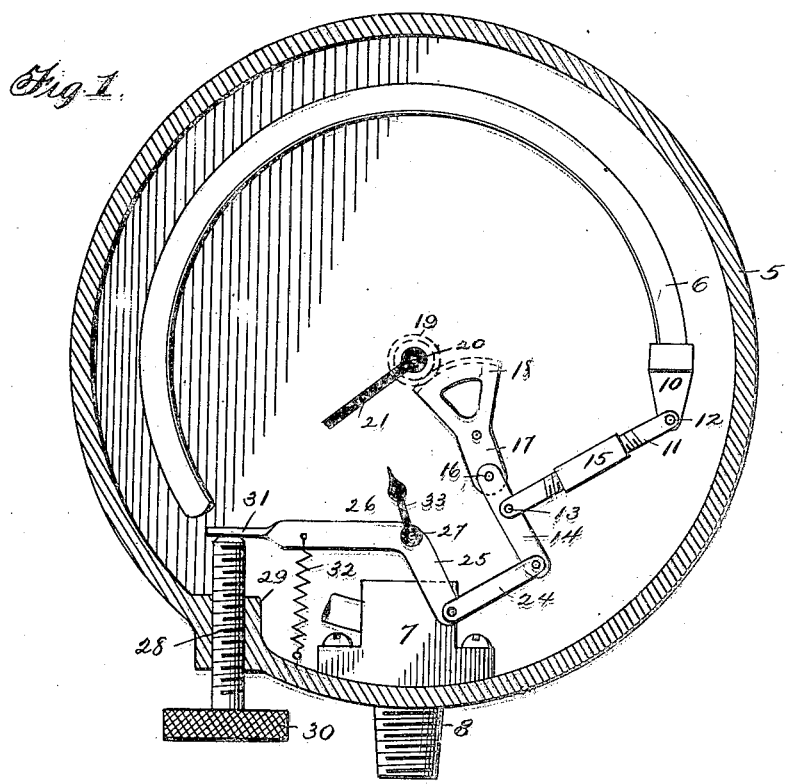
Fig. 1 is a view of the gauge constructed in accordance with the invention with the case of the gauge shown in section and with the pointer controlling mechanism in elevation.
Figure 2:
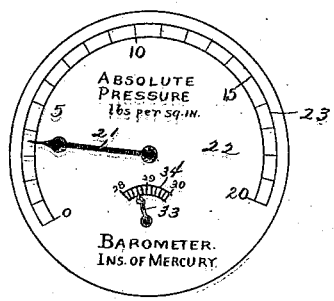
Fig. 2 is a reduced face view of the dial of the gauge.

Referring to the drawings it will be seen that in each form of the invention a case 5, houses a pressure actuated element 6, which may be a Bourdon tube, said tube receiving pressure through a block 7 that is provided with a connection 8, in the usual and well known way. The tube 6 carries a head 10 to which one end of a link 11 is pivoted at 12. The other end of this link is pivoted at 13 to a floating lever 14. The link 11 preferably includes a turnbuckle 15 in its length, which serves a purpose hereinafter set forth, One end of the floating lever 14 is connected by a pivot 16, with a tail extension 17 of an arcuate rack 18. This rack meshes with a pinion 19 that is fast upon the shaft 20 of pointed 21.

The pointer 21 moves over the face of the dial 22 and coacts with a scale 23 in the usual and well known way. The end of the floating lever 14 remote from the tail extension 17 is connected by a link 24 with an arm 25 of a bell crank lever designated 26 in Fig. 1 and 26ª in Fig. 3 which has a pivotal mounting at 27.

The compensatory action which is the primary object of the present invention is effected by moving the bell crank lever 26 or 26ª in accordance with variations in atmospheric pressure. This movement of the bell crank lever may be effected manually or automatically, as heretofore set forth. In Fig. 1 this movement is effected by means of a screw 28 that is threaded into a bearing 29 of the case. This screw has a, preferably, knurled head 30 located exteriorly of the case. The inner end of the screw bears against the extremity 31 of the bell crank lever 26 and a spring 32 tends to draw said extremity against the end of the screw. A pointer 33 mounted concentrically with the pivot 27 coacts with a barometric scale 34 formed upon the dial 22. The parts are so arranged that if, through the medium of the screw 28 the pointer 33 be moved to indicate upon the scale 34, the then prevailing atmospheric pressure as determined by the reading of a separate barometer; the resultant movement imparted to the arcuate rack 18 will act upon the pointer 21 to a sufficient degree to compensate for any change in atmospheric pressure which may have taken place since the previous setting of the pointer 33.

Figure 3:
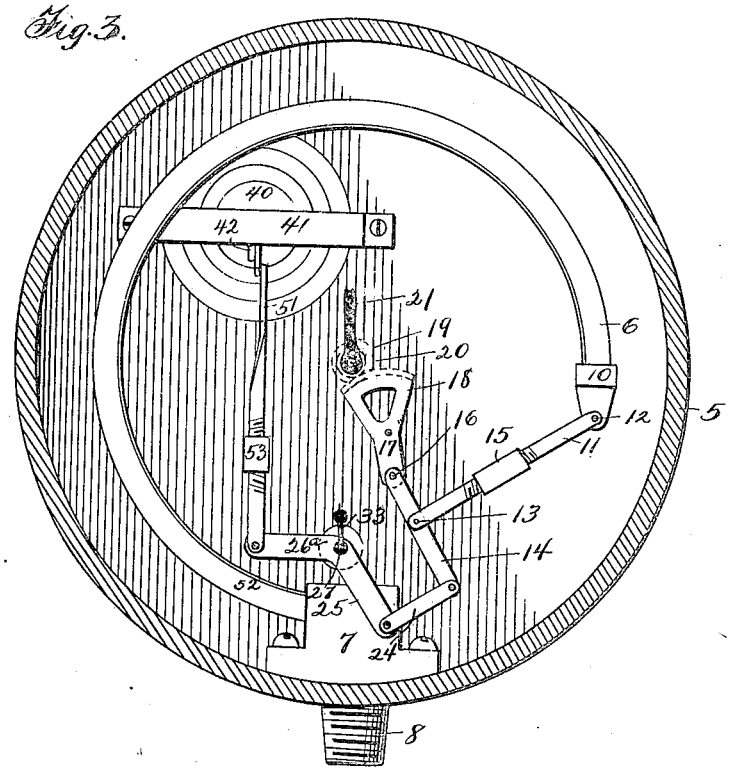
Fig. 3 is a view like Fig. 1 but with an aneroid barometer substituted for the manually actuated screw of Fig. 1 for effecting the compensatory action.
Figure 4:
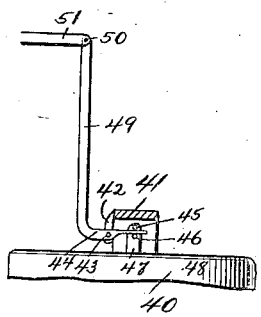
Fig. 4 is a detail sectional view illustrating a part of the connections between the barometer and the pointer.

In the form of the invention illustrated in Figs. 3 and 4, movement of the bell crank 26 which corresponds to the bell crank 26 in Fig. 1, is effected through the medium of an aneroid barometer 40. This barometer is spanned by a strap 41 which carries a depending extension 42, said extension constituting a bearing for a pivot 43 that is engaged with one arm 44 of an L shaped lever. The extremity of the arm 44 lies between two pins 45 and 46 that are carried by a stud 47 which projects from the top of the box 48 of the barometer; it being understood that this top is the usual flexible diaphragm, the position of which varies with variations in atmospheric pressure. The extremity of the other arm 49 of the L shaped lever is pivotally connected at 50 with a link 51, the opposite end of said link being pivotally connected at 52 to the extremity of the bell crank lever 26ª. The link 51 preferably includes a turnbuckle 53 within its length.

In order that the reason for providing the compensatory action set forth may be fully appreciated, it is pointed out that practically all of the gauges in use at the present time are constructed in such manner as to indicate pressures above and below atmospheric pressure, as a datum. In other words, the zero points of the said gauges correspond to atmospheric pressure instead of corresponding to a complete vacuum. However, since the atmospheric pressure constantly varies, it is manifest that such gauges cannot accurately represent the true absolute pressure existing in the space to which the gauge is connected, because such space has no connection with the atmosphere, and the pressure therein prevailing does not vary with the atmospheric pressure. Therefore, in order to produce a gauge that will be entirely accurate, I so construct the same that the zero point thereof corresponds to a true vacuum and provide, in conjunction with the pointer actuating means consisting of the Bourdon tube 6, floating lever 14, and arcuate rack 18 the means herein shown and described consisting of link 24, bell crank 26 or 26ª and the actuating means therefor, which serve to so modify the action of the pointer actuating means as to compensate for variations in atmospheric pressure and to cause the resultant reading of the gauge to indicate the true absolute pressure, without computation, at any given time. Under present conditions, if it is desired to determine an accurate value of the absolute pressure from an ordinary type of gauge, it is necessary to read both the gauge and the barometer, whose readings must be reduced to the same units, if they are not already in the same units, and added together, if the pressure measured is above atmospheric pressure. In measuring a pressure which is less than atmospheric, the vacuum gauge is read, the barometer is read and the reading of the vacuum gauge is subtracted from the barometer reading.

It is manifest that the dials may be graduated in many different ways in accordance with the work that the gauge is called upon to do. The pressures may be indicated in any units whatever, English, metric or any other, and in correspondence with the pressure scales, there may be scales of the temperature of vaporization of any substance or scales of any other quantity which varies with and depends upon the temperature, such, for example, as scales of the density of saturated vapor, of total heat or the like.

As is well known Bourdon tube gauges gradually shift their zero point with age and sustained pressure. The method commonly employed for correcting this is to remove the pointer from the stem and press it on again in a new position, so that the gauge registers correctly. The provision of the turnbuckle 15 renders it possible to calibrate the gauge without removing the pointer, while the turnbuckle 53 provides means for correcting the barometer reading as indicated by the pointer 33.

It will be observed that a pointer 33 is indicated in both Figs. 1 and 3. In Fig. 1 this pointer serves the function of indicating to the operator when the screw 30 has been turned enough to effect the compensatory action, this point being reached when the pointer 33 indicates upon the scale 34 the then prevailing atmospheric pressure. It is manifest that this pointer is not needed for this purpose in Fig. 3 because the barometer automatically effects the adjustment. However in the case of Fig. 3 the pointer 33 acts over the scale 34 and causes the structure to serve the double function of a barometer and a compensating gauge.

It is to be understood that the invention is not limited to the precise construction set forth but that it includes within its purview whatever changes fairly come within either the terms or the spirit of the appended claims.

Having described my invention, what I claim is

1. A gauge having a dial graduated in terms of absolute pressure, a pointer movable thereover, a pressure actuated element by which said pointer is moved, a barometer and connections between said barometer and the pointer for automatically shifting the latter with respect to the dial to compensate for fluctuations of atmospheric pressure and to permit the true absolute pressure to be determined from an inspection of the gauge without computation.

2. A gauge comprising a dial, a pointer operable thereover, a pressure actuated member, connections between the pressure actuated member and the pointer for actuating the latter, a barometer and connections between the barometer and the first named connection for modifying the action of said first named connection upon the pointer in accordance with fluctuations in atmospheric pressure to thereby compensate for the latter in the resultant readings of the gauge.

3. A gauge comprising a dial, a pointer operable thereover, a pressure actuated member, connections between said member and the pointer, said connections comprising a pivoted element, a barometer and connections between the barometer and the pivoted element operable to shift the fulcrum of the latter in accordance with variations in atmospheric pressure.

4. A gauge comprising a dial, a pointer operable thereover, a pressure actuated member, connections between said member and the pointer, said connections comprising a pivoted element, and means operable to shift the fulcrum of said pivoted element in accordance with variations in atmospheric pressure and means for indicating when such shifting is in accordance with the then existing atmospheric pressure.

5. A gauge comprising a dial, a pointer operable thereover, a pressure actuated member, connections between said member and the pointer including a pivoted element, there being a pressure scale upon the dial with which the pointer coacts and there being a barometric scale upon the dial, an element, means for moving said element in accord with variations in atmospheric pressure, connections between said last named element and said pivoted element for shifting the position of the latter to modify the action of the pivoted element upon the pointer in accord with such variations in atmospheric pressure, and a pointer included in the last named connections and cooperating with the barometric scale.

6. A gauge comprising a dial, a pointer operable thereover, a pressure actuated member, means for actuating the pointer from the pressure actuated member comprising an arcuate rack, a floating lever pivotally connected to said rack, a connection between said floating lever and the pressure actuated member, a member, means for moving said member in accordance with variations in atmospheric pressure and a connection between the last named member and the floating lever.

7. A gauge comprising a dial, a pointer operable thereover, a pressure actuated member, there being a pressure scale and a barometric scale upon the dial, connections between the pressure actuated member and the pointer including an arcuate rack, a floating lever pivotally connected to the arcuate rack, a connection between the pressure actuated member and the floating lever, a movable element, a connection between said movable element and the floating lever and a pointer carried by the movable element and coacting with the barometric scale of the dial.

8. A structure as recited in claim 7 wherein said movable element is pivoted and wherein the last named pointer is mounted concentric to the pivot point thereof.

9. A gauge comprising a dial, a pointer operable thereover, there being a pressure scale upon the dial the zero point of which corresponds to a true vacuum, there being a barometric scale upon the dial, a pressure actuated member, connections between said member and the pointer including an element adjustable as to length and including a pivoted element, a barometer and connections between the barometer and the pivoted element adjustable as to length and operable to shift the fulcrum of the latter in accordance with variations in atmospheric pressure.

10. A gauge comprising a dial, a pointer operable thereover, there being a pressure scale upon the dial the zero point of which corresponds to a true vacuum, there being a barometric scale upon the dial, a pressure actuated member, connections between said member and the pointer, a barometer, connections between the barometer and the first named connections operable to modify the action of the latter in accordance with variations in atmospheric pressure and a pointer movable by the connections from the barometer and coacting with the barometric scale upon the dial.

11. A gauge comprising a dial, a pointer operable thereover, there being a pressure scale thereon the zero point of which corresponds to a true vacuum, a pressure actuated member, connections between said member and the pointer, said connections comprising a pivoted element, a barometer, a bell crank lever, a connection between said barometer and the bell crank lever and a connection between the bell crank lever and the pivoted element operable to shift the fulcrum of the latter in accordance with variations in atmospheric pressure to thereby effect a compensatory action upon the pointer in accordance with variations in atmospheric pressure.

In testimony whereof I hereunto affix my signature.

CHARLES HAROLD BERRY.